INVENTORS
HANS BULLINGER and
IVAN E. BUCK, Jr.
BY
*W. D. Palmer*
ATTORNEY.

3,275,870
CERAMIC TYPE ELECTROLUMINESCENT DEVICE WITH MOISTURE PENETRATION PREVENTION SEAL
Ivan E. Buck, Jr., East Orange, and Hans Bullinger, Bloomfield, N.J., assignors to Westinghouse Electric Corporation, East Pittsburgh, Pa., a corporation of Pennsylvania
Filed Jan. 9, 1962, Ser. No. 165,075
5 Claims. (Cl. 313—108)

This invention relates to electroluminescent devices and, more particularly, to electroluminescent devices having improved performance characteristics and a method for protecting such devices and securing them within a housing.

The phenomena of electroluminescence was first disclosed by G. Destriau, one of his earlier publications appearing in London, Edinburgh and Dublin Philosophical Magazine, Serial 7, vol. 38, No. 285, pages 700–737 (October 1947). Since this early publication, electroluminescent devices have been marketed commercially. In one construction for electroluminescent devices, finely divided phosphor is embedded in a plastic dielectric material. In another construction for such devices, the phosphor is embedded in a glass or ceramic material in the form of a layer and the energizing electric field is applied across this layer to produce light. Electroluminescent devices in which the phosphor is embedded in glass or ceramic material are categorized as "ceramic-type" electroluminescent devices.

In the usual ceramic-type electroluminescent device, a layer comprising finely divided electroluminescent phosphor is embedded in a light-transmitting ceramic dielectric material and is formed onto a metallic substrate. This metallic substrate is normally relatively heavy and is quite impervious to penetration by moisture. Over the phosphor-ceramic layer is formed a light-transmitting electrode. Such electrodes are normally quite susceptible to penetration by moisture and are required to be protected. Protection against moisture can be obtained by covering the light-transmitting electrode layer with a relatively thick layer of a thermoset resin, such as epoxy resin, which is resistant to penetration by moisture. Alternatively, a protective glass covercoat can be provided by applying over the light-transmitting electrode layer, a frit of finely divided glass and firing this frit to form a continuous glass layer. While such glass covercoat layers are normally quite satisfactory, it is difficult to match the thermal expansion coefficient of such layers with the coefficient of expansion of the phosphor-dielectric layer of the device, with the result that temperature extremes may crack the device. In addition, a fired glass frit which forms a continuous layer is not as resistant to penetration by moisture as a preformed piece of glass which is prepared by rolling, for example. Also, thick protective layers of epoxy resin are not as completely impervious to penetration by moisture as desired and, in addition, are relatively expensive.

It is the general object of this invention to provide a ceramic-type electroluminescent device which is effectively sealed against ingress of moisture.

It is another object to provide a ceramic-type electroluminescent device which can be operated over a wide range of temperatures.

It is a further object to provide a method for effectively protecting a ceramic-type electroluminescent device from damage by moisture during later operation and also simultaneously securing the electroluminescent device within a housing, as is normally required for commercial use.

The aforesaid objects of the invention, and other objects which will become apparent as the description proceeds, are achieved by providing a ceramic-type electroluminescent device wherein a preformed, light-transmitting vitreous layer which is impervious to penetration by moisture is positioned to overlay substantially all portions of the light-transmitting electrode layer of the device. Between the protective vitreous layer and the light-transmitting electrode layer is placed a thin, continuous layer of light-transmitting, thermoset adhesive which is resistant to penetration by moisture and which adheres to both the light-transmitting electrode layer and the overlaying protective layer. In addition, there is provided a method for applying such a layer wherein the device is simultaneously secured within a housing, as is required for commercial application.

For a better understanding of the invention, reference should be had to the accompanying drawings wherein.

Figure 1:
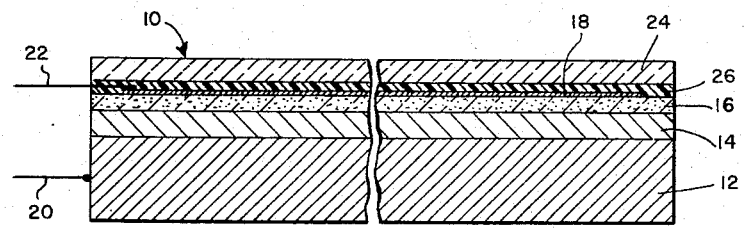
FIG. 1 is a sectional elevation of an electroluminescent device fabricated in accordance with the present invention.

With specific reference to the form of the invention shown in the drawings, in FIG. 1 is illustrated an electroluminescent device 10 which generally comprises a conducting substrate 12 over which is applied a semiconductor material layer 14 comprising an iron-titanate containing material. A phosphor-dielectric material layer 16 is carried over the layer 14 and a light-transmitting electrode layer 18 is carried over the phosphor-dielectric layer 16. Lead-in conductors 20 and 22 connect to the electrode layers 12 and 18. In accordance with the present invention, a preformed layer 24 of glass, which is impervious to penetration by moisture, is affixed to the light-transmitting electrode layer 18 by means of a thin, continuous, cured, light-transmitting layer 26 of thermoset adhesive.

As a specific example, the conducting substrate 12 is formed of conventional enameling iron of twenty-two gauge thickness. The enameling iron is coated with the iron-titanate-containing layer 14 which is formed of a titania-precipitating glass having the following weight percentage composition: $Na_2O$, 10.5%; $K_2O$, 3.5%; $B_2O_3$, 14%; $SiO_2$, 45%; $TiO_2$, 20%; $P_2O_5$, 2%; and $F_2$, 5%. Other suitable glasses can be substituted for this specific example. Also, the metallic plate substrate-electrode 12 can be replaced by a layer of preformed glass which is impervious to penetration by moisture and which glass substrate has a light-transmitting electrode layer, such as a tin oxide for example, formed on the substrate surface which faces the phosphor-dielectric layer. Such a device will emit light from both faces. If desired, a buffer-dielectric layer (not shown) which comprises from 80% to 95% by weight of finely divided barium-titanate and from 20% to 5% by weight of glass, fused about the titanate, can be provided over the layer 14.

The phosphor comprising the layer 16 is embedded in light-transmitting glass dielectric material. Any suitable electroluminescent phosphor can be used and, as an example, zinc sulfide phosphor which is activated by copper and coactivated by chlorine has been found to be very suitable. The phosphor is finely divided and, as an example, has an average particle diameter of about 10 microns. This particle diameter is subject to considerable variation. As a specific example, the glass in which the phosphor is embedded has the following formulation: $SiO_2$, 10.1%; $B_2O_3$, 21.5%; $TiO_2$, 4.9%; $ZnO$, 29.2%;

BaO, 16.3%; CaO, 4.5%; MgO, 1.8%; $K_2O$, 8.3%; and $Na_2O$, 3.4%. Seven parts by weight of glass are used per four parts by weight of phosphor. The weight ratio of phosphor to glass is not critical and the glass content can be varied over an extremely wide range, for example from 10 parts by weight to 2.5 parts by weight per 4 parts by weight of phosphor. Other suitable glasses can be substituted for this example.

The light-transmitting, electrically conductive layer 18 is preferably formed of tin oxide which is deposited in accordance with known techniques. Other suitable electrode material, such as indium oxide, can be substituted for the tin oxide in forming the electrode layer 18. The substrate 12, the light-transmitting electrode layer 18 and the various ceramic and phosphor-dielectric layers sandwiched therebetween form the operative portions of the electroluminescent device. Such a device is generally disclosed in copending application Serial No. 78,156, filed December 23, 1960, and owned by the present assignee.

In accordance with the present invention, the layer 24 of rolled sheet glass, which has such dimensions as to substantially completely overlay the light-transmitting electrode layer 18, is affixed to the electrode layer 18 by means of the thin, continuous layer 26 of cured, thermoset adhesive which is light transmitting in order to pass the light which is generated by the device. As a specific example, epoxy resin has been found to be very suitable. It should be noted that epoxy resins are well known for use with electroluminescent devices and are disclosed in copending application Serial No. 822,231, now Patent No. 3,030,542 filed June 23, 1959, and owned by the present assignee. Such resins, under extreme conditions of humidity, are not as completely resistant to penetration by moisture as a preformed layer of sheet glass. In the device of the present invention, the overlying glass layer 24 need not be matched in coefficient of expansion with the remainder of the device, since the epoxy resin layer 26 is quite resilient when in extremely thin layer form and will yield without fracturing to compensate for expansion differences between the overlaying glass layer 24 and the remainder of the device 10.

It should be understood that any suitable light-transmitting, moisture-impervious material can be substituted for the rolled glass of which the layer 24 is preferably formed, since the thermoset adhesive layer 26 will compensate for expansion differences between the layer 24 and the remainder of the device 10. In addition, any suitable thermoset adhesive which is light-transmitting, resistant to penetration by moisture and resilient when in thin-layer form, can be substituted for the preferred epoxy resin in forming the layer 26.

In actual test results, ceramic-type electroluminescent devices fabricated in accordance with the present invention have been operated satisfactorily for several hundred hours under extreme conditions of 98% relative humidity and a temperature of 50° C. Under these extreme conditions, the usual ceramic-type device will fail very rapidly. In addition, the devices of the present invention have been operated at temperature variations of from −30° C. to 60° C. with no apparent damage. This is attributed to the resiliency of the thin epoxy resin layer 26.

Figure 2:
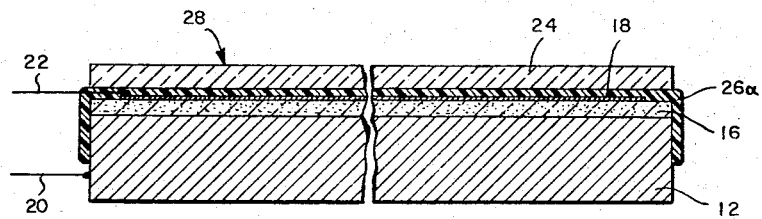
FIG. 2 is a sectional elevation of an alternative construction of the device as shown in FIG. 1.

The present device is subject to considerable modification and an alternative embodiment 28 is shown in FIG. 2. Briefly, this embodiment corresponds to the embodiment 10 as shown in FIG. 1 except that the phosphor-dielectric layer 16 is sandwiched directly between the electrode substrate 12 and the light-transmitting electrode layer 18. In addition, the epoxy resin layer 26a has been extended as a continuous layer over and adherent to the edge portions of both the electrode layers 12 and 18 and the phosphor-dielectric layer 16. This will afford additional moisture protection for the device.

As a further alternative embodiment, an additional layer of plastic can be placed between the light-transmitting electrode 18 and the thin, continuous layer 26 of thermoset adhesive. Such a construction is disclosed in the aforementioned copending application Serial No. 822,231, now Patent No. 3,030,542 filed June 23, 1959, and owned by the present assignee.

Figure 3:
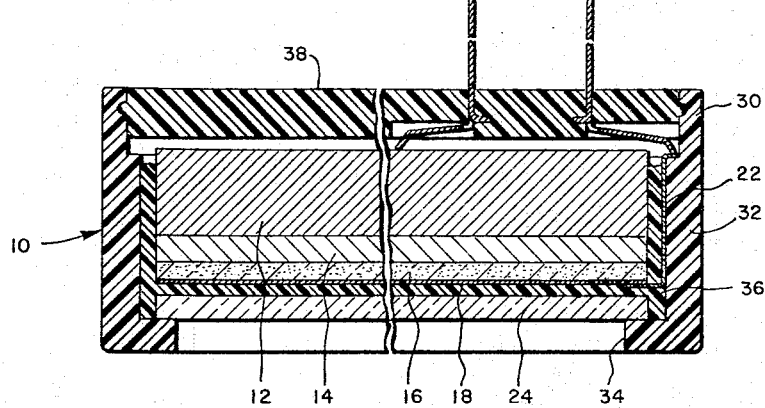
FIG. 3 is a sectional elevation of the device as shown in FIG. 1, wherein the device is mounted within a suitable housing as required for commercial application; and, FIG. 4 is a flow diagram setting forth the steps of the present method.
Figure 4:
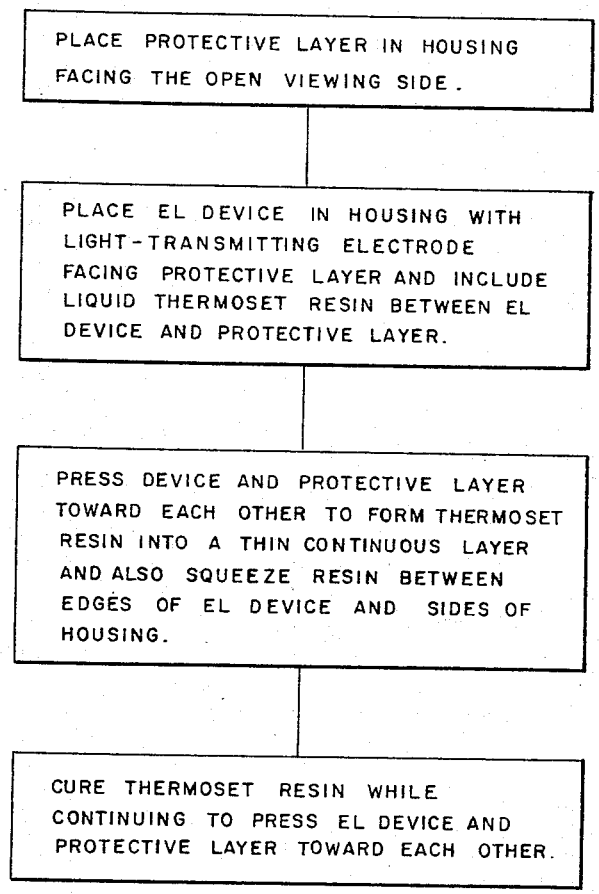

In FIG. 3 is shown the device 10, as illustrated in FIG. 1, but mounted in a suitable housing 30, as required for commercial use. The housing 30 has a receptacle portion formed by sides 32 and an end portion 34 is open and adapted to serve as a viewing face. In securing the electroluminescent device 10 within the housing 30 in the manner as set forth in the flow diagram of FIG. 4, the protective, preformed glass layer 24 is placed within the receptacle portion of the housing 30 and adjacent the viewing face 34 thereof. The operative portion of the electroluminescent device 10, which operative portion includes the electrode layers and phosphor dielectric and ceramic layers sandwiched therebetween, is then placed into the receptacle portion of the housing 30, with the light-transmitting electrode layer 18 facing the protective layer 24.

There is included between the protective layer 24 and the light-transmitting electrode layer 18 a predetermined amount of the uncured, thermoset adhesive which will be used to form the layer 26, as shown in FIG. 1. The predetermined amount of this adhesive, which is excessive over that required to form the thin continuous layer 26, is placed between the protecting layer 24 and the electrode layer 18. The operative portion of the electroluminescent device 10 and the protective layer 22 are then pressed toward each other until only a thin, continuous layer of the uncured adhesive remains therebetween and the excessive uncured adhesive 36 is forced from between the electrode layer 18 and the protective layer 24, in order to bridge voids between the edge portions of the device 10 and the inner surface of the sides 32 of housing 30. Thereafter, the epoxy resin is cured while continuing to press the protective layer 24 and the exposed surface of the electrode layer 18 toward each other. The resulting device is protected, during later operation, from penetration by moisture through the light-transmitting electrode layer 18 and, simultaneously, the device is secured within the housing 30. Thereafter, a suitable contact adaptor 38 is affixed to the back of the housing 30 and electrical connection made to the electrode layers 12 and 18.

It will be recognized that the objects of the invention have been achieved by providing a ceramic-type electroluminescent device which is resistant to penetration by moisture and which can be operated under temperature or humidity extremes without failure. In addition, there has been provided a method for protecting the device during operation from penetration by moisture through the light-transmitting electrode layer portion thereof, while simultaneously securing the device within a housing.

While best examples of the invention have been illustrated and described in detail, it is to be particularly understood that the invention is not limited thereto or thereby.

We claim as our invention:

1. A ceramic-type electroluminescent device which is effectively sealed against ingress of moisture: the operative portion of said device comprising, a first electrode layer which is impervious to penetration by moisture, a light-transmitting second electrode layer substantially parallel to and spaced from said first electrode layer and which is pervious to penetration by moisture, and a layer comprising finely divided electroluminescent phosphor embedded in light-transmitting ceramic dielectric material included between said spaced electrode layers; a preformed light-transmitting vitreous layer which is impervious to penetration by moisture overlaying substantially all portions of said second electrode layer and exterior to the operative portion of said device; a thin, continuous, resilient, cured, light-transmitting thermoset adhesive formed as a layer which is resistant to penetration by moisture between and adhering together said light-transmitting second electrode layer and said overlaying vitreous layer; and means for connecting said electrode layers across a source of alternating electric potential.

2. The device as specified in claim 1, wherein said thermoset adhesive extends as a continuous layer over and adherent to the edge portions of said electrode layers and said layer comprising phosphor and ceramic dielectric.

3. The device as specified in claim 1, wherein said theromset adhesive is epoxy resin.

4. The device as specified in claim 1, wherein said preformed, light-transmitting layer is formed of glass.

5. The device as specified in claim 1, wherein said first electrode layer is formed of a metallic plate.

References Cited by the Examiner

UNITED STATES PATENTS

| 2,834,903 | 5/1958 | Roberts | 313—108 |
| 3,007,070 | 10/1961 | Cargill | 313—108.1 |
| 3,043,979 | 7/1962 | Van Geel et al. | 313—108.1 |
| 3,103,608 | 9/1963 | Ham | 313—108 |
| 3,118,086 | 1/1964 | Knochel et al. | 313—108 |
| 3,201,296 | 8/1965 | Kilduff et al. | 156—108 |

JAMES W. LAWRENCE, *Primary Examiner.*

GEORGE N. WESTBY, C. R. CAMPBELL, R. L. JUDD,
*Assistant Examiners.*